(12) United States Patent
Montojo et al.

(10) Patent No.: US 8,681,666 B2
(45) Date of Patent: Mar. 25, 2014

(54) PARTIAL DISCARDING OF CYCLIC PREFIX FOR EFFICIENT TDD OR HALF-DUPLEX FDD OPERATION

(75) Inventors: Juan Montojo, San Diego, CA (US); Durga Malladi, San Diego, CA (US); Shimman Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 981 days.

(21) Appl. No.: 12/206,624

(22) Filed: Sep. 8, 2008

(65) Prior Publication Data

US 2009/0122731 A1    May 14, 2009

Related U.S. Application Data

(60) Provisional application No. 60/976,772, filed on Oct. 1, 2007.

(51) Int. Cl.
*H04L 1/00* (2006.01)
*H04J 3/00* (2006.01)
*H04L 27/28* (2006.01)

(52) U.S. Cl.
USPC ............................. 370/280; 370/216; 375/260

(58) Field of Classification Search
USPC ............................. 370/216, 228, 280; 375/260
See application file for complete search history.

(56) References Cited

U.S. PATENT DOCUMENTS

| 2004/0151109 | A1* | 8/2004 | Batra et al. ................... 370/208 |
| 2005/0281292 | A1* | 12/2005 | Troulis et al. ................. 370/516 |
| 2006/0087961 | A1* | 4/2006 | Chang et al. .................. 370/203 |
| 2006/0215539 | A1* | 9/2006 | Vrcelj et al. .................. 370/208 |
| 2007/0061163 | A1  | 3/2007 | Smith |
| 2008/0101262 | A1* | 5/2008 | Brunel et al. ................. 370/278 |
| 2008/0107047 | A1* | 5/2008 | Olfat ............................. 370/280 |

FOREIGN PATENT DOCUMENTS

| CN | 1860690 A | 11/2006 |
| EP | 1071260 A1 | 1/2001 |
| JP | 2000307677 A | 11/2000 |
| JP | 2000315989 A | 11/2000 |
| WO | 2007053124 A1 | 5/2007 |

OTHER PUBLICATIONS

Taiwan Search Report—TW097137804—TIPO—Feb. 5, 2012.
International Search Report & Written Opinion—PCT/US2008/078276, International Search Authority—European Patent Office—Apr. 2, 2009.

* cited by examiner

*Primary Examiner* — Habte Mered
*Assistant Examiner* — Yaotang Wang (57) ABSTRACT

Techniques for performing partial cyclic prefix discarding are described. A user equipment (UE) may reduce the amount of cyclic prefix to discard for the last OFDM symbol prior to a switch from data reception to data transmission. This may allow the UE to complete data reception earlier and to switch to data transmission in a timely manner. In one design, the UE may receive a first OFDM symbol and discard a first amount of cyclic prefix for the first OFDM symbol. The UE may then receive a second OFDM symbol and discard a second amount of cyclic prefix for the second OFDM symbol. The second amount of cyclic prefix to discard may be determined based on the amount of time needed to switch from data reception to data transmission, which may be dependent on the amount of time advance between transmit timing and receive timing at the UE.

24 Claims, 9 Drawing Sheets

PARTIAL DISCARDING OF CYCLIC PREFIX FOR EFFICIENT TDD OR HALF-DUPLEX FDD OPERATION

The present application claims priority to provisional U.S. Application Ser. No. 60/976,772, entitled "PARTIAL DISCARDING OF CP FOR EFFICIENT TDD OPERATION," filed Oct. 1, 2007, assigned to the assignee hereof and incorporated herein by reference.

BACKGROUND

I. Field

The present disclosure relates generally to communication, and more specifically to techniques for transmitting and receiving data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A UE may be able to only transmit or receive data at any given moment. The UE may receive data from a Node B some of the time and may transmit data to the Node B some other time. A guard period of no transmission may be defined for each switch point from data reception to data transmission. The guard period may allow the UE to complete data reception and start data transmission at the appropriate time so that the Node B can receive the data transmission with the proper timing at the Node B. The guard period represents overhead and reduces the efficiency of the system. It is desirable to reduce the guard period as much as possible in order to improve system efficiency.

SUMMARY

Techniques for performing partial cyclic prefix discarding in order to obtain more time to switch from data reception to data transmission are described herein. For partial cyclic prefix discarding, a UE may reduce the amount of cyclic prefix to discard for the last orthogonal frequency division multiplexing (OFDM) symbol prior to a switch from data reception to data transmission. This may allow the UE to complete data reception earlier and to switch to data transmission in a timely manner. The techniques may reduce or possibly eliminate the guard period, which may improve system efficiency. The techniques may be used for time division duplex (TDD) operation as well as half-duplex frequency division duplex (FDD) operation.

In one design, a UE may receive a first OFDM symbol and may discard a first amount of cyclic prefix (e.g., the entire cyclic prefix) for the first OFDM symbol. The UE may then receive a second OFDM symbol, which may be the last OFDM symbol prior to a switch from data reception to data transmission. The UE may discard a second amount of cyclic prefix (e.g., a partial cyclic prefix) for the second OFDM symbol. The second amount of cyclic prefix to discard may be determined based on a switch time to switch from data reception to data transmission. The UE may send a single-carrier frequency division multiplexing (SC-FDM) symbol in accordance with transmit timing, which may be advanced relative to receive timing at the UE. The UE may determine the switch time based on the amount of time advance between the transmit timing and the receive timing at the UE.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
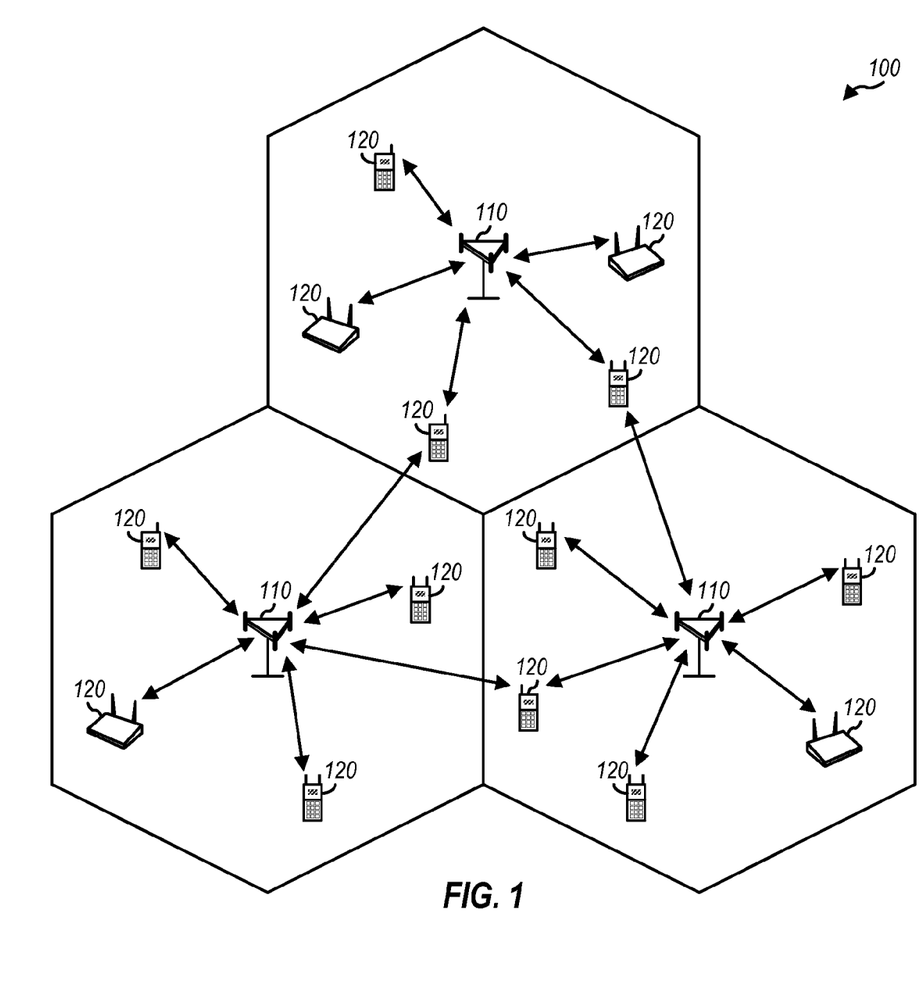
FIG. 1 shows a wireless communication system.

FIG. 1 shows a wireless communication system 100, which may be an LTE system. System 100 may include a number of Node Bs 110 and other network entities. A Node B may be a fixed station that communicates with the UEs and may also be referred to as an evolved Node B (eNB), a base station, an access point, etc. Each Node B 110 provides communication coverage for a particular geographic area. The overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B.

LTE utilizes OFDM on the downlink and SC-FDM on the uplink. OFDM and SC-FDM partition the system bandwidth into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

Figure 2:
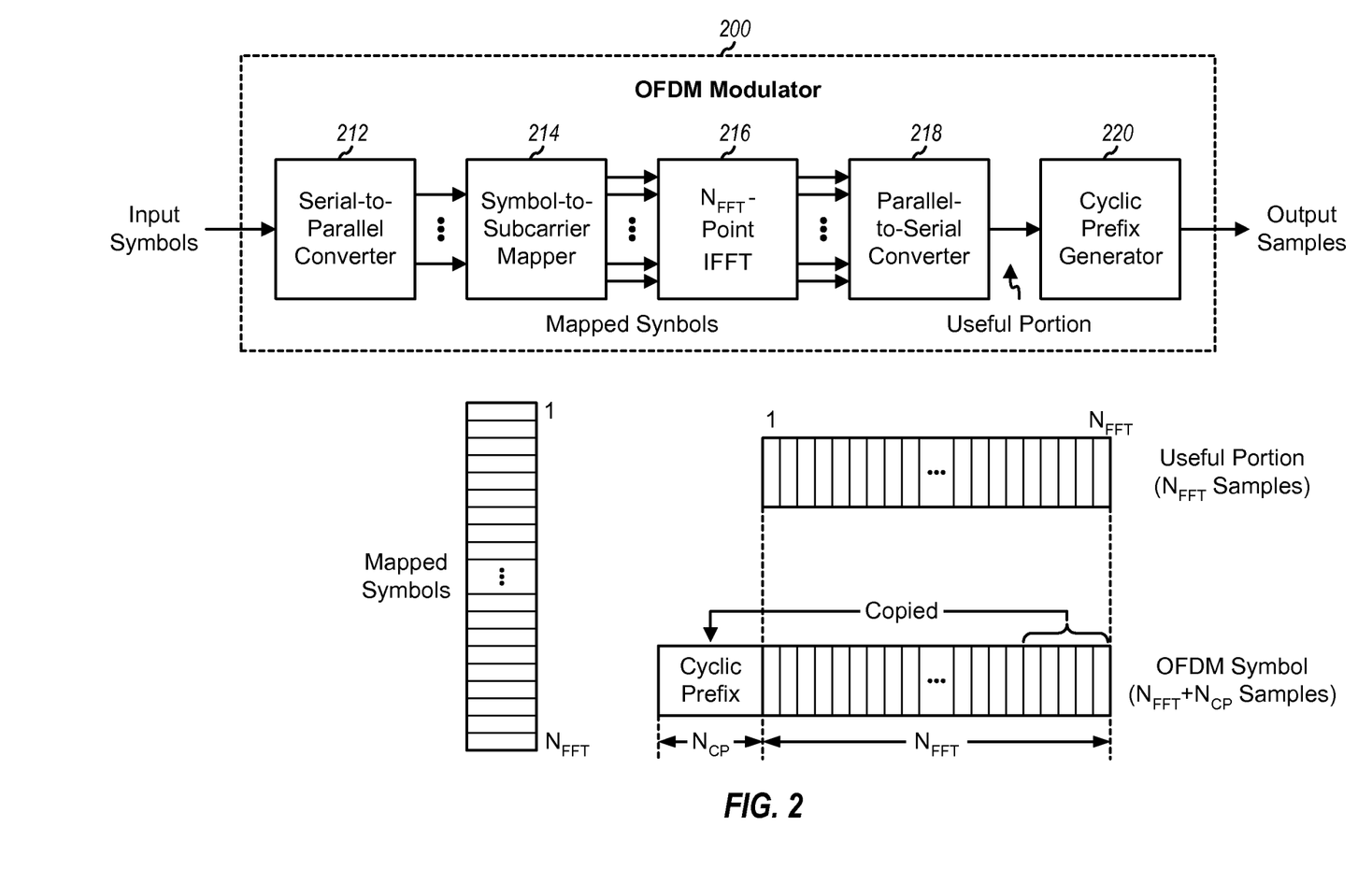
FIG. 2 shows a block diagram of an OFDM modulator.

FIG. 2 shows a block diagram of a design of an OFDM modulator 200 for a transmitter, e.g., a Node B. Within OFDM modulator 200, a serial-to-parallel (S/P) converter 212 may receive input symbols (e.g., modulation symbols) and may provide these input symbols in parallel form. A symbol-to-subcarrier mapper 214 may map the input symbols to subcarriers used for transmission and may map zero symbols with signal value of zero to the remaining subcarriers. An inverse fast Fourier transform (IFFT) unit 216 may receive $N_{FFT}$ mapped symbols for the $N_{FFT}$ total subcarriers in one OFDM symbol period. IFFT unit 216 may transform the $N_{FFT}$ mapped symbols to the time domain with an $N_{FFT}$-point IFFT and provide $N_{FFT}$ time-domain samples. Each sample is a complex value to be sent in one sample period. A parallel-to-serial (P/S) converter 218 may serialize the $N_{FFT}$ samples and provide a useful portion containing these samples. A cyclic prefix generator 220 may copy the last $N_{CP}$ samples of the useful portion and append these $N_{CP}$ samples to the front of the useful portion to obtain an OFDM symbol containing $N_{FFT}+N_{CP}$ samples. The copied portion is referred to as a cyclic prefix (CP), and $N_{CP}$ is the cyclic prefix length. The cyclic prefix is used to combat inter-symbol interference (ISI) caused by frequency selective fading.

For an SC-FDM modulator (e.g., at a UE), K input symbols may first be transformed with a K-point discrete Fourier transform (DFT) to obtain K frequency-domain symbols. The K frequency-domain symbols may be processed by symbol-to-subcarrier mapper 214, IFFT unit 216, P/S converter 218, and cyclic prefix generator 220 to obtain an SC-FDM symbol containing $N_{FFT}$ samples for a useful portion and $N_{CP}$ samples for a cyclic prefix.

The system may utilize FDD or TDD. For FDD, the downlink and uplink are allocated separate frequency channels, downlink transmission may be sent on one frequency channel, and uplink transmission may be sent on another frequency channel. For TDD, the downlink and uplink share the same frequency channel, downlink transmission may be sent on the frequency channel some of the time, and uplink transmission may be sent on the same frequency channel some other time.

Figure 3A:
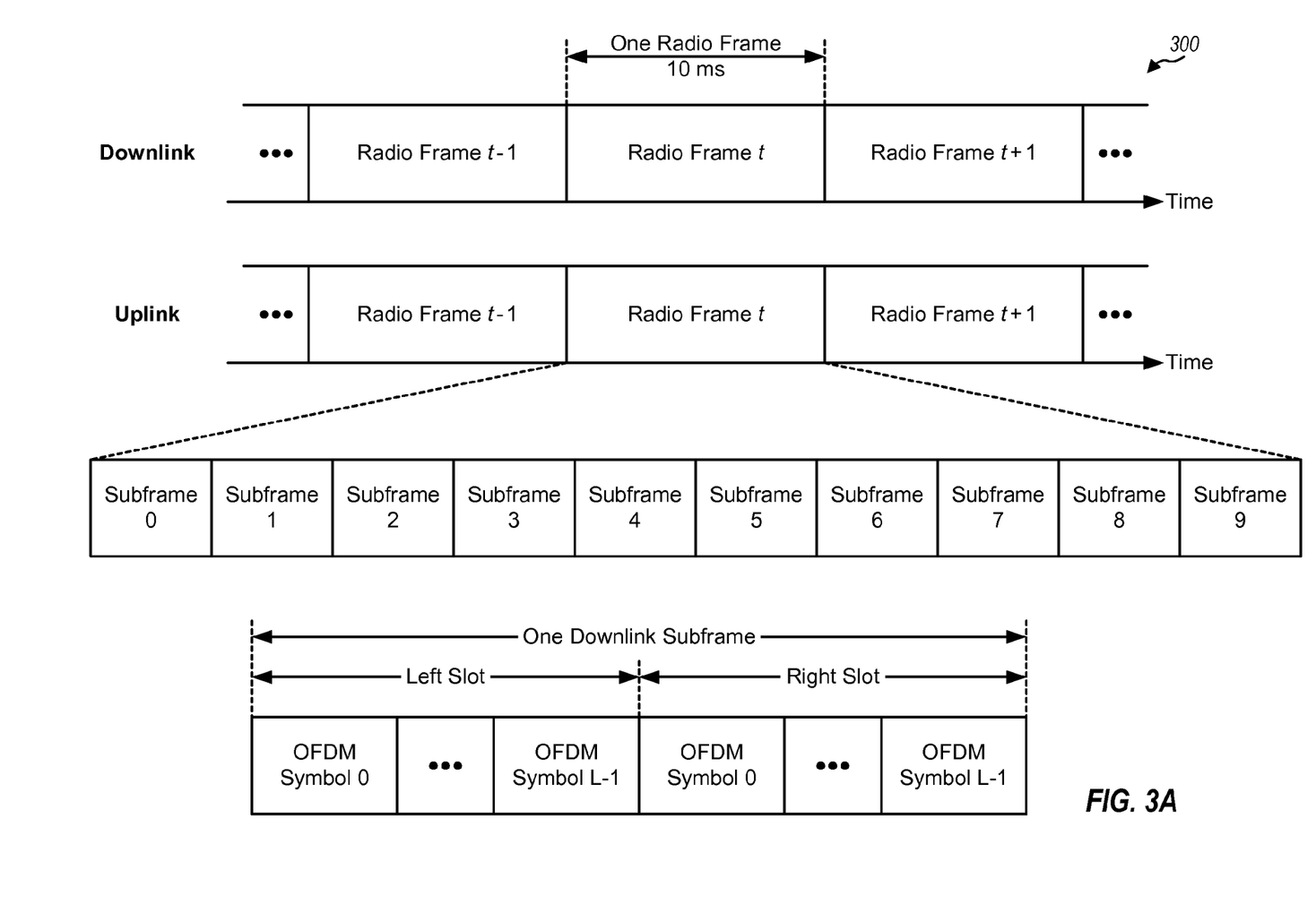
FIGS. 3A and 3B show two example frame structures.

FIG. 3A shows an example frame structure 300 of a frame structure type 1 (FS1), which may be used for FDD in LTE. The transmission timeline for each link may be partitioned into units of radio frames. Each radio frame may have a predetermined duration (e.g., 10 milliseconds (ms)) and may be partitioned into 10 subframes with indices of 0 through 9. Each subframe may include two slots, and each slot may include L symbol periods with indices of 0 through L−1, e.g., L=6 symbol periods for an extended cyclic prefix or L=7 symbol periods for a normal cyclic prefix.

For FDD, 10 subframes may be available for downlink transmission and 10 subframes may be available for uplink transmission in each radio frame. For full-duplex FDD, a UE may send an uplink transmission to a Node B and may concurrently receive a downlink transmission from the Node B. For half-duplex FDD, a UE may send an uplink transmission and receive a downlink transmission at different times, so that the uplink and downlink transmissions do not overlap in time.

Figure 3B:
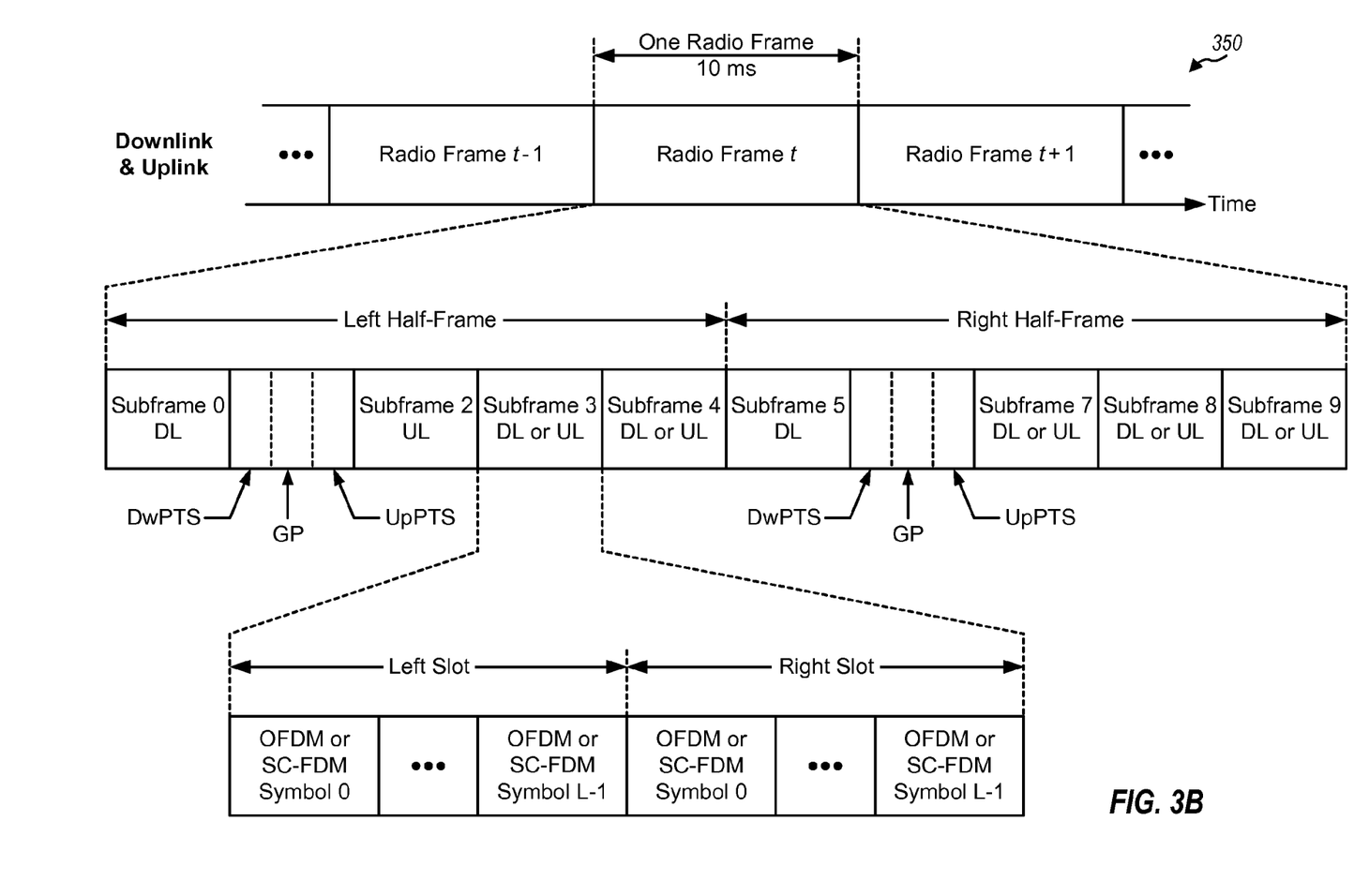

FIG. 3B shows an example frame structure 350 of a frame structure type 2 (FS2), which may be used for TDD in LTE. The transmission timeline may be partitioned into units of radio frames. Each radio frame may have a duration of 10 ms and may be partitioned into 10 subframes with indices of 0 through 9. LTE supports multiple downlink-uplink configurations. Subframes 0 and 5 may be used for the downlink (DL) and subframe 2 may be used for the uplink (UL) for all downlink-uplink configurations. Subframes 3, 4, 7, 8 and 9 may each be used for the downlink or uplink depending on the downlink-uplink configuration. Subframe 1 may include three special fields composed of a downlink pilot time slot (DwPTS) used for downlink control channels as well as data transmissions, a guard period (GP) of no transmission, and an uplink pilot time slot (UpPTS) used for either a random access channel (RACH) or sounding reference signals (SRS). Subframe 6 may include only the DwPTS, or all three special fields, or a downlink subframe depending on the downlink-uplink configuration. The DwPTS, GP and UpPTS may have different durations for different subframe configurations. Each subframe that is not used for the special fields may be partitioned into two slots, and each slot may include L symbol periods.

Frame structures 300 and 350 are described in 3GPP TS 36.211, entitled "Evolved Universal Terrestrial Radio Access (E-UTRA); Physical Channels and Modulation," which is publicly available.

For both TDD and half-duplex FDD operation, a UE may receive data on downlink subframes and may send data on uplink subframes, with the downlink subframes not overlapping the uplink subframes. A downlink subframe is a subframe in which data may be sent on the downlink, and an uplink subframe is a subframe in which data may be sent on the uplink. For both TDD and half-duplex FDD operation, a guard period may be defined at a switch point from downlink to uplink and may cover $N_{GP}$ OFDM symbols in the downlink subframe immediately preceding the switch point. No transmissions are sent in the guard period. The guard period may allow the UE to start an uplink transmission with adequate time advance so that the receive time at a Node B can be aligned with the transmit time at the Node B.

Figure 4:
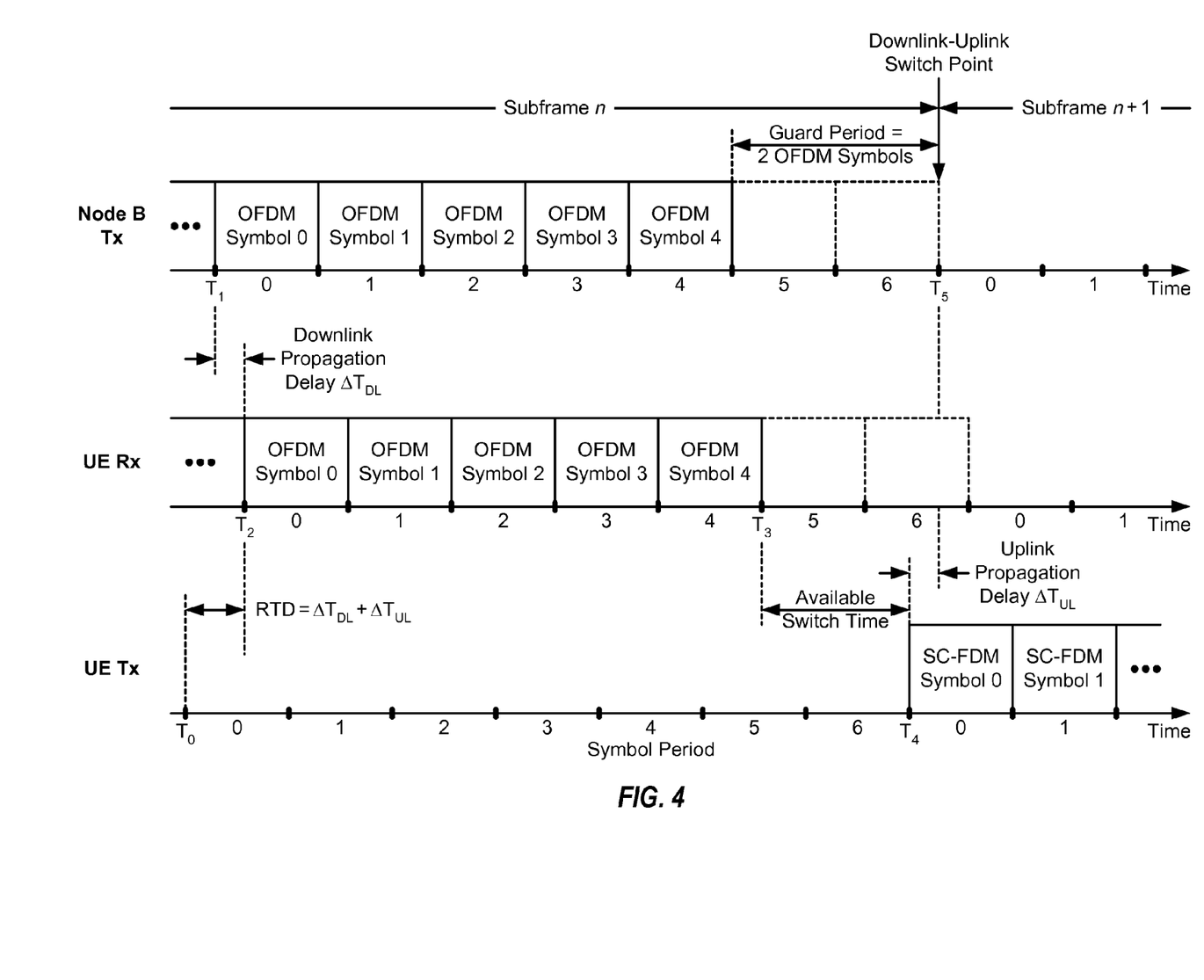
FIG. 4 shows example downlink and uplink transmissions for TDD or half-duplex FDD operation.

FIG. 4 shows an example of downlink and uplink transmissions for TDD or half-duplex FDD operation with a guard period at a downlink-uplink switch point. A Node B transmits data on the downlink in subframe n, and a UE transmits data on the uplink in subframe n+1. The downlink-uplink switch point occurs at time $T_5$, which coincides with the boundary between subframes n and n+1 at the Node B.

In the example shown in FIG. 4, each slot includes 7 symbol periods for the normal cyclic prefix, and the guard period is $N_{GP}=2$ OFDM symbols. The Node B transmits OFDM symbols 0 through 4 in symbol periods 0 through 4 of the right slot of subframe n and does not transmit in symbol periods 5 and 6. The UE receives OFDM symbols 0 through 4 from the Node B in subframe n. OFDM symbol 0 is transmitted by the Node B starting at time $T_1$ and is received by the UE starting at time $T_2$. The difference between the receive time $T_2$ and the transmit time $T_1$ is the downlink propagation delay $\Delta T_{DL}$, which is $\Delta T_{DL}=T_2-T_1$.

The UE transmits SC-FDM symbol 0 in symbol period 0 of the left slot of subframe t+1. SC-FDM symbol 0 is transmitted by the UE starting at time $T_4$ and is received by the Node B starting at time $T_5$. The difference between the receive time $T_5$ and the transmit time $T_4$ is the uplink propagation delay $\Delta T_{UL}$, which is $\Delta T_{UL}=T_5-T_4$. The transmit time $T_4$ at the UE may be selected such that the receive time $T_5$ at the Node B is aligned with the downlink-uplink switch point at the subframe boundary. The time duration from the end of the last OFDM symbol 4 on the downlink (which is time $T_3$) to the start of the first SC-FDM symbol 0 on the uplink (which is time $T_4$) is the amount of time available to the UE to switch from downlink reception to uplink transmission.

In essence, the UE would need to send an uplink transmission at time $T_0$ in order for the Node B to receive the uplink transmission at time $T_1$. The Node B may send a downlink transmission at time $T_1$, and the UE may receive the downlink transmission at time $T_2$. A round trip delay (RTD) is equal to the difference between receive time $T_2$ and transmit time $T_0$ at the UE, or RTD=$T_2-T_0=\Delta T_{DL}+\Delta T_{UL}$. The transmit timing at the UE is thus advanced by one RTD relative to the receive timing at the UE to allow the Node B to have the same transmit and receive timing.

A guard period may have a configurable duration. Table 1 lists supported guard periods in subframe 0, subframe 5, and remaining subframes of a radio frame, in accordance with one design. Other guard periods may also be supported. In the design shown in Table 1, a guard period of zero is supported. A Node B may transmit OFDM symbols in all symbol periods of a subframe with a guard period of zero.

TABLE 1

| | Supported guard periods (in number of OFDM symbols) | | |
|---|---|---|---|
| Configuration | Subframe 0 | Subframe 5 | All other subframes |
| Normal cyclic prefix | 0, 1, 2, 3, 4, 5 | 0, 1, 2, 3, 4, 5 | 0, 1, 2, 3, 4, 5, 12 |
| Extended cyclic prefix | 0, 1, 2, 3 | 0, 1, 2, 3, 4 | 0, 1, 2, 3, 4, 10 |

Table 2 lists OFDM numerology for the normal cyclic prefix and the extended cyclic prefix in LTE. The useful portion of an OFDM symbol may include $N_{FFT}=2048$ samples and span 66.67 microseconds (μs) for both the normal and extended cyclic prefixes. The normal cyclic prefix may include $N_{CP}=160$ samples for OFDM symbol 0 and $N_{CP}=144$ samples for each of OFDM symbols 1 through 6. The extended cyclic prefix may include $N_{CP}=512$ samples for each OFDM symbol.

TABLE 2

| | Normal cyclic prefix | | | | Extended cyclic prefix | |
|---|---|---|---|---|---|---|
| | OFDM symbol 0 | | OFDM symbols 1-6 | | | |
| | samples | time μs | samples | time μs | samples | time μs |
| Useful portion duration | 2048 | 66.67 | 2048 | 66.67 | 2048 | 66.67 |
| Cyclic prefix duration | 160 | 5.21 | 144 | 4.69 | 512 | 16.67 |
| OFDM symbol duration | 2208 | 71.88 | 2192 | 71.35 | 2560 | 83.33 |

RTD may be dependent on the distance between a Node B and a UE. The first two columns of Table 3 give RTD for different line-of-sight distances between the UE and the Node B.

TABLE 3

| RTD versus cell size | | RTD + setup time versus cell size | |
|---|---|---|---|
| Node B-UE distance (km) | RTD (μs) | Node B-UE distance (km) | RTD + setup time (μs) |
| 0.1 | 0.67 | 0.1 | 2.67 |
| 0.5 | 3.33 | 0.5 | 5.53 |
| 1 | 6.67 | 1 | 8.67 |
| 2 | 13.33 | 2 | 15.33 |
| 3 | 20.00 | | |
| 10 | 66.67 | | |

As shown in FIG. 4, the UE would need to send an uplink transmission one RTD prior to its receive time at a downlink-uplink switch point. The time advance of one RTD may ensure that the receive time at the Node B matches the transmit timing at the Node B even with non-zero propagation delays on the downlink and uplink.

The UE may require a particular amount of setup time to switch circuitry from downlink reception to uplink transmission. The setup time may be dependent on the design of the UE and may be on the order of 1 to 2 μs. A switch time may be defined as follows:

$$T_{SWITCH}=\text{RTD}+T_{SETUP}, \quad \text{Eq (1)}$$

where $T_{SWITCH}$ is the switch time and $T_{SETUP}$ is the setup time. The switch time is the amount of time that the UE needs from the end of downlink reception to the start of uplink transmission in order to switch circuitry and send the uplink transmission with the proper time advance.

The last two columns of Table 3 give the switch time for different line-of-sight distances between the Node B and the UE, assuming a setup time of 2 μs. As shown in Table 3, the switch time is well within the normal cyclic prefix duration for Node B-UE distance of 100 meters. The switch time is within the extended cyclic prefix duration for Node B-UE distance of 2 kilometers (km) or less.

In an aspect, partial cyclic prefix discarding may be used to obtain more time for the UE to switch from downlink reception to uplink transmission in TDD or half-duplex FDD operation. Partial cyclic prefix discarding may be used to support operation with a guard period of zero OFDM symbols, which may improve system efficiency. For partial cyclic prefix discarding, the UE may reduce the amount of cyclic prefix to discard for the last OFDM symbol prior to a downlink-uplink switch point so that the switch time can be satisfied while reducing ISI to the extend possible.

Figure 5:
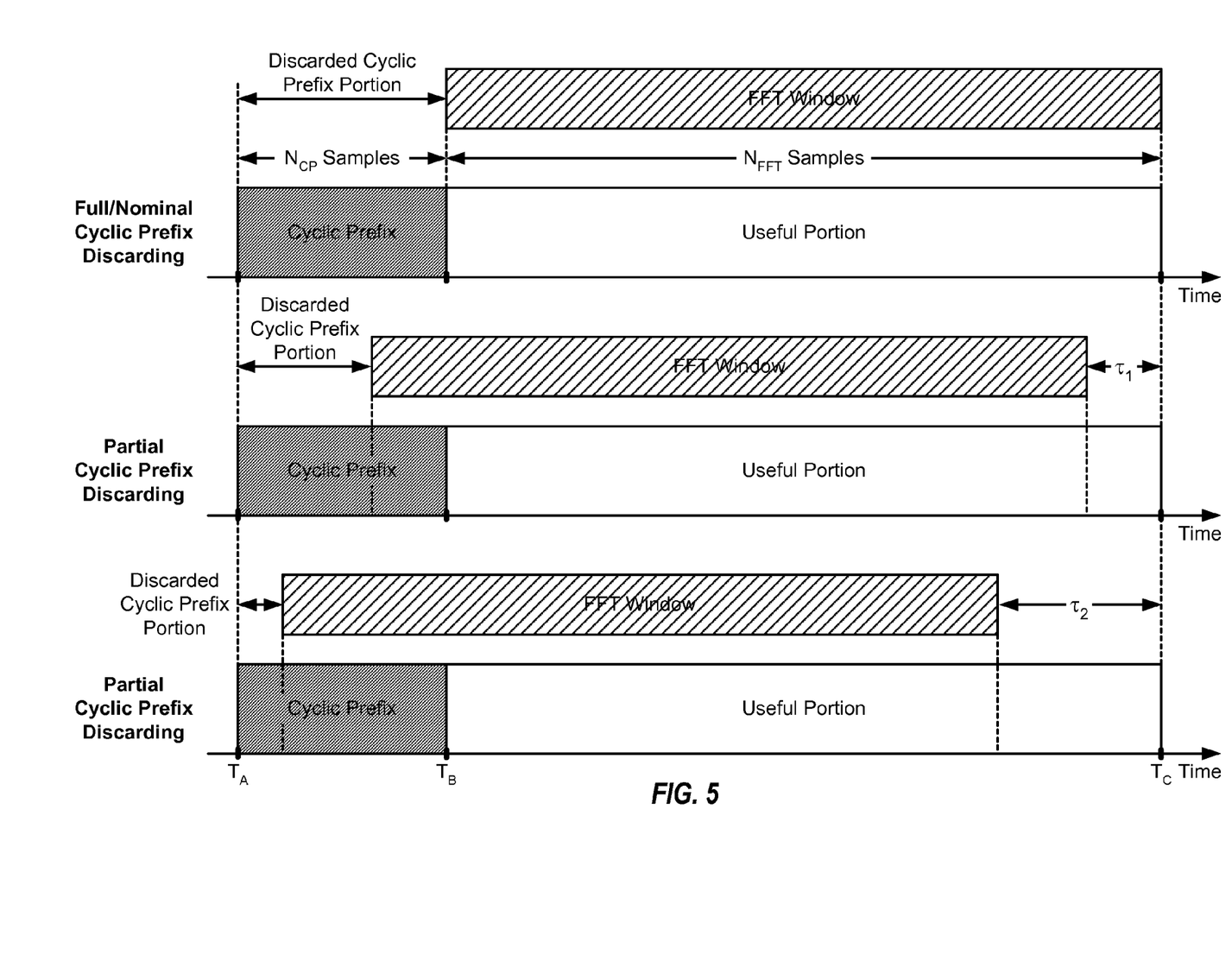
FIG. 5 shows full and partial cyclic prefix discarding.

FIG. 5 shows full and partial cyclic prefix discarding for the last OFDM symbol received by the UE prior to a downlink-uplink switch point. The received OFDM symbol includes $N_{CP}$ samples for the cyclic prefix followed by $N_{FFT}$ samples for the useful portion. The cyclic prefix starts at time $T_A$ and ends at time $T_B$, where $T_B-T_A=N_{CP}$. The useful portion starts at time $T_B$ and ends at time $T_C$, where $T_C-T_B=N_{FFT}$. A fast Fourier transform (FFT) window of size $N_{FFT}$ selects only $N_{FFT}$ samples among the $N_{FFT}+N_{CP}$ total samples between times $T_A$ and $T_C$ for processing by an FFT for OFDM demodulation.

For full/nominal cyclic prefix discarding, the FFT window may be placed such that it overlaps the useful portion, as shown at the top of FIG. 5. All or most of the cyclic prefix would be discarded, and all or most of the useful portion would be processed for OFDM demodulation. In this case, all of most of the cyclic prefix would be used to combat ISI, and the corresponding inter-carrier interference (ICI) would be minimized. However, the entire OFDM symbol time would be used for downlink reception, and the switch to uplink transmission would not commence until the end of the OFDM symbol at time $T_C$. Since the UE may need to start transmitting one RTD prior to the end of the last OFDM symbol and may also need some time to switch circuitry, the full/nominal cyclic prefix discarding may make it impossible for the UE to finish the downlink reception and start the uplink transmission at the proper time for TDD or half-duplex FDD operation.

One example of partial cyclic prefix discarding is shown in the middle of FIG. 5. In this example, the FFT window is placed such that it starts somewhere within the cyclic prefix. The cyclic prefix is partially discarded, and some of the cyclic prefix as well as most of the useful portion are selected by the FFT window for subsequent processing. This partial cyclic prefix discarding provides a time period of $\tau_1$ at the end of the FFT window that may be used for the switch time.

Another example of partial cyclic prefix discarding is shown at the bottom of FIG. 5. In this example, the FFT window is placed such that it starts near the beginning of the cyclic prefix. The cyclic prefix is partially discarded, and most of the cyclic prefix as well as most of the useful portion are selected by the FFT window for subsequent processing. This partial cyclic prefix discarding provides a time period of $\tau_2$ at the end of the FFT window that may be used for the switch time.

For partial cyclic prefix discarding, the circularity or cyclic property of the OFDM symbol is exploited, and samples from both the cyclic prefix and the useful portion are used for OFDM demodulation. The difference between the two examples of partial cyclic prefix discarding in FIG. 5 is the amount of cyclic prefix being discarded. In general, discarding more cyclic prefix (e.g., in the middle example) may result in lower ISI/ICI while providing less time at the end of the FFT window for the switch time. Conversely, discarding less cyclic prefix (e.g., in the bottom example) may result in higher ISI/ICI while providing more time for the switch time. The amount of cyclic prefix to discard may be selected based on the switch time.

Figure 6:
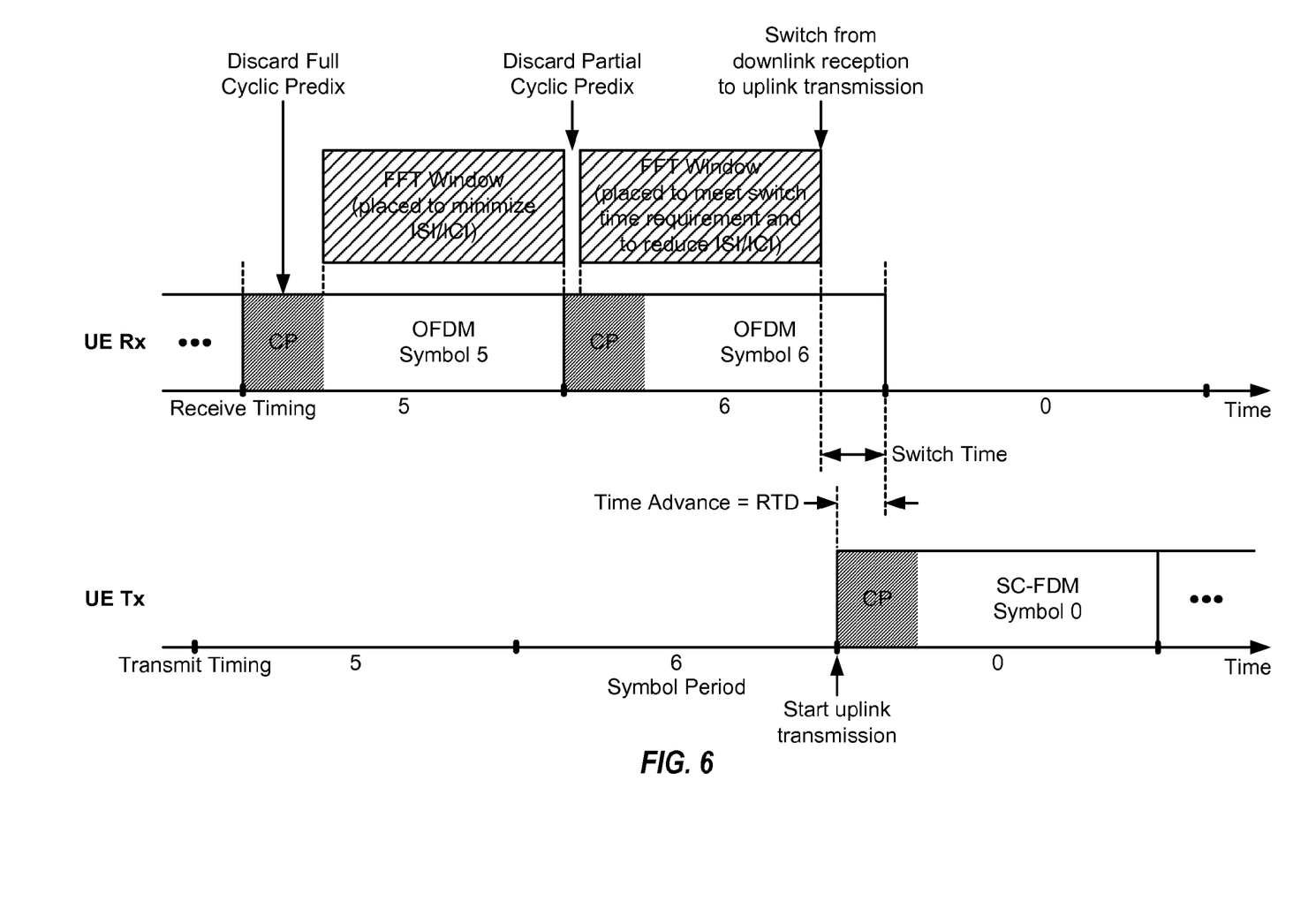
FIG. 6 shows data reception with partial cyclic prefix discarding.

FIG. 6 shows a design of using partial cyclic prefix discarding for the last OFDM symbol prior to a downlink-uplink switch point. In this design, for each received OFDM symbol except for the last OFDM symbol, the FFT window may be placed such that all or most of the cyclic prefix may be discarded in order to obtain good ISI/ICI performance. For the last OFDM symbol, the FFT window may be placed such that (i) only part of the cyclic prefix is discarded and (ii) the switch time can be met while reducing ISI/ICI to the extent possible. The FFT window for the last OFDM symbol may start within the cyclic prefix and may be less than one OFDM symbol period (or less than $N_{FFT}+N_{CP}$ samples) from the start of the FFT window for the immediately preceding OFDM symbol. The FFT window for the last OFDM symbol may end at least the switch time from the end of the last OFDM symbol, as shown in FIG. 6.

In general, the following options may be available for the last OFDM symbol prior to a downlink-uplink switch point:
 1. Use a guard period of $N_{GP}=1$ OFDM symbol and thus lose system capacity corresponding to one OFDM symbol on the downlink,
 2. Use a guard period of $N_{GP}=0$ OFDM symbol and not discard any part of the cyclic prefix, or
 3. Use a guard period of $N_{GP}=0$ OFDM symbol and partially discard the cyclic prefix.

Option 2 may provide the most time (e.g., the entire cyclic prefix duration) for the switch time but may result in performance degradation due to higher ISI/ICI. Option 3 may provide a tradeoff between the amount of time gain for the switch time and the amount of performance degradation due to ISI/ICI. More of the cyclic prefix may be used for OFDM demodulation in order to obtain more switch time at the cost of potentially greater performance degradation due to ISI/ICI.

For option 3, the entire switch time of $T_{SWITCH}$ may be taken from downlink reception by advancing the FFT window for the last OFDM symbol by an amount equal to the switch time, as shown in FIG. 6. The UE may then switch to uplink transmission $T_{SWITCH}$ seconds prior to the end of the last OFDM symbol.

In another design, the switch time may be split between downlink reception and uplink transmission. In this design, the UE may switch to uplink transmission $T_{DL}$ seconds prior to the end of the last OFDM symbol before a downlink-uplink switch point. The UE may also discard the first $T_{UL}$ seconds of the cyclic prefix of the first SC-FDM symbol sent on the uplink after the downlink-uplink switch point, where $T_{SWITCH}=T_{DL}+T_{UL}$. The UE may generate the first SC-FDM symbol in the normal manner but may zero out samples corresponding to the first $T_{UL}$ seconds of the cyclic prefix. In effect, partial cyclic prefix discarding is performed for both the last OFDM symbol received on the downlink prior to the switch point as well as the first SC-FDM symbol sent on the uplink after the switch point. This design may spread the potentially higher ISI/ICI due to partial cyclic prefix discarding across two OFDM/SC-FDM symbols, which may improve overall performance. This design may also be used to support a switch time that is longer than one cyclic prefix duration.

In another design, the extended cyclic prefix may be used for a downlink subframe preceding an uplink subframe. The longer extended cyclic prefix of 16.67 μs may provide more time to switch from downlink reception to uplink transmission and may also allow more of the cyclic prefix to be discarded in order to reduce ISI/ICI.

The techniques described herein may be used to partially discard the cyclic prefix and advance the FFT window in order to obtain more time to switch from downlink reception to uplink transmission. The techniques may be used with zero guard period, as described above. The techniques may also be used to obtain more time to switch when a guard period of one or more OFDM symbols is used. The supported guard periods in Table 1 are relatively coarse and have a granularity of one OFDM symbol. The techniques may be used to obtain guard periods of finer granularity, which may allow for better balancing between the switch time and potential ICI/ISI degradation. In general, the techniques can provide an extra 0 to $T_{CP}$ seconds for switch time at the UE, where $T_{CP}$ is the cyclic prefix duration. If the guard period is n OFDM symbols, where n may be an integer value of zero or greater, then the techniques can provide between $n \cdot T_{SYM}$ to $n \cdot T_{SYM}+T_{CP}$ seconds for switch time, instead of only $n \cdot T_{SYM}$ seconds, where $T_{SYM}$ is the OFDM symbol duration.

Figure 7:
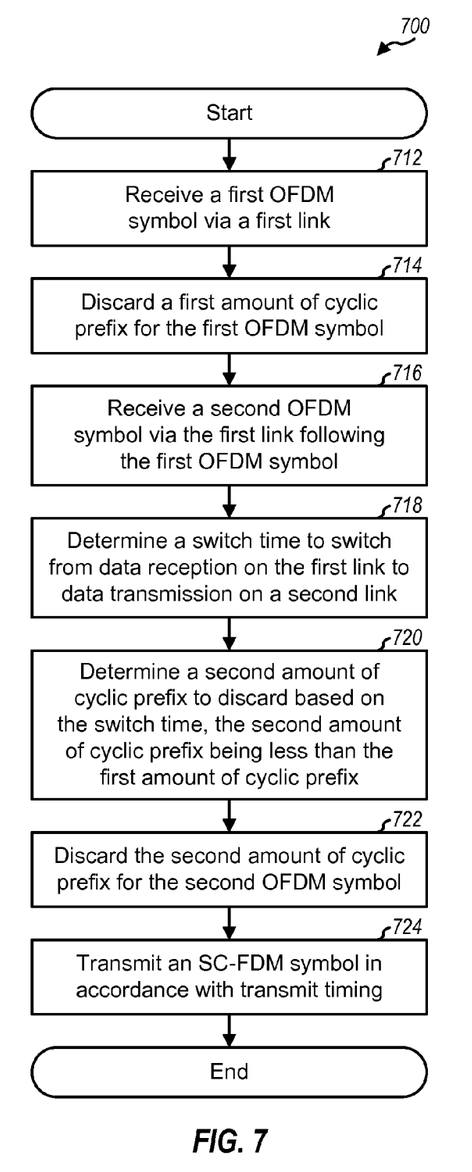
FIG. 7 shows a process for receiving and transmitting data.

FIG. 7 shows a design of a process 700 for receiving and transmitting data in a wireless communication system. Process 700 may be performed by a UE (as described below) or by some other entity.

The UE may receive a first OFDM symbol via a first link, e.g., the downlink (block 712). The UE may discard a first amount of cyclic prefix for the first OFDM symbol (block 714). The UE may receive a second OFDM symbol via the first link following the first OFDM symbol (block 716). The second OFDM symbol may be the last OFDM symbol prior to a switch point from data reception on the first link to data transmission on a second link, e.g., the uplink. The UE may determine a switch time to switch from data reception to data transmission (block 718). In one design, the UE may determine an RTD between the UE and a Node B and may then determine the switch time based on the RTD and a setup time for switching from data reception to data transmission, e.g., as shown in equation (1).

The UE may determine a second amount of cyclic prefix to discard based on the switch time, with the second amount of cyclic prefix being less than the first amount of cyclic prefix (block 720). The UE may then discard the second amount of cyclic prefix for the second OFDM symbol (block 722). In one design, the UE may place an FFT window to start within the cyclic prefix of the second OFDM symbol. The UE may then discard a portion of the cyclic prefix of the second OFDM symbol outside of the FFT window. The UE may place the FFT window to end at least the switch time earlier than the end of the second OFDM symbol, e.g., as shown in FIG. 6. The UE may discard the entire cyclic prefix of the first OFDM symbol and may discard a partial cyclic prefix of the second OFDM symbol.

The UE may transmit an SC-FDM symbol (or possibly an OFDM symbol) in accordance with its transmit timing (block 724). The transmit timing may be advanced relative to the receive timing at the UE, e.g., as shown in FIGS. 4 and 6. The switch time may be determined based on the amount of time advance between the transmit timing and the receive timing. In one design, to distribute the switch time between data reception and data transmission, a portion of the cyclic prefix of the SC-FDM symbol may also be discarded, with the discarded cyclic prefix portion being determined based on the switch time. The partial cyclic prefix discarding may provide more time in addition to the guard period to switch from data reception to data transmission.

Data reception on the first link and data transmission on the second link may be for TDD or half-duplex FDD operation. A guard period of zero OFDM symbols or an integer number of OFDM symbols may be used between data reception and data transmission.

Figure 8:
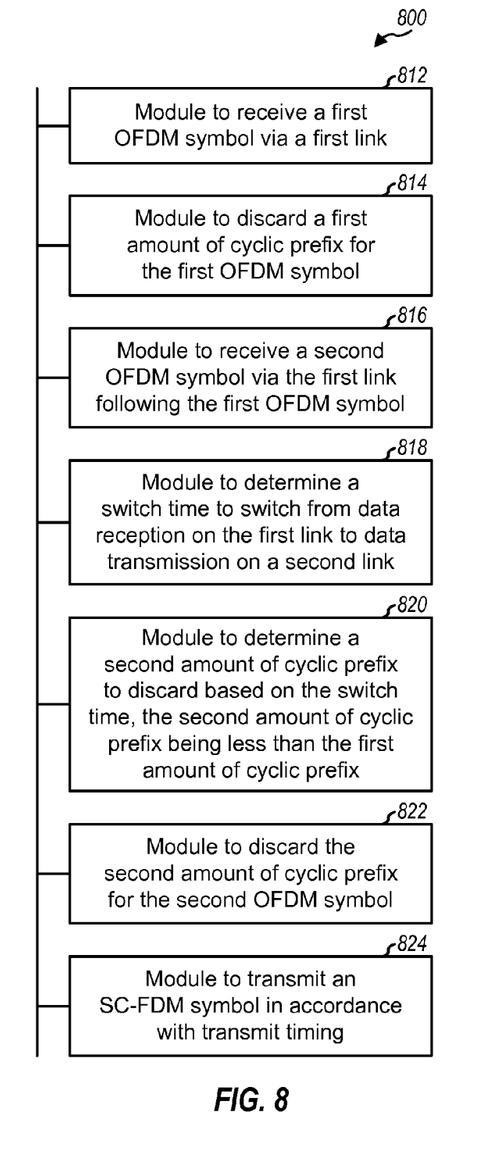
FIG. 8 shows an apparatus for receiving and transmitting data.

FIG. 8 shows a design of an apparatus 800 for receiving and transmitting data in a wireless communication system. Apparatus 800 includes a module 812 to receive a first OFDM symbol via a first link, a module 814 to discard a first amount of cyclic prefix for the first OFDM symbol, a module 816 to receive a second OFDM symbol via the first link following the first OFDM symbol, a module 818 to determine a switch time to switch from data reception on the first link to data transmission on a second link, a module 820 to determine a second amount of cyclic prefix to discard based on the switch time, with the second amount of cyclic prefix being less than the first amount of cyclic prefix, a module 822 to discard the second amount of cyclic prefix for the second OFDM symbol, and a module 824 to transmit an SC-FDM symbol (or possibly an OFDM symbol) in accordance with transmit timing. The modules in FIG. 8 may comprise processors, electronics devices, hardware devices, electronics components, logical circuits, memories, etc., or any combination thereof.

Figure 9:
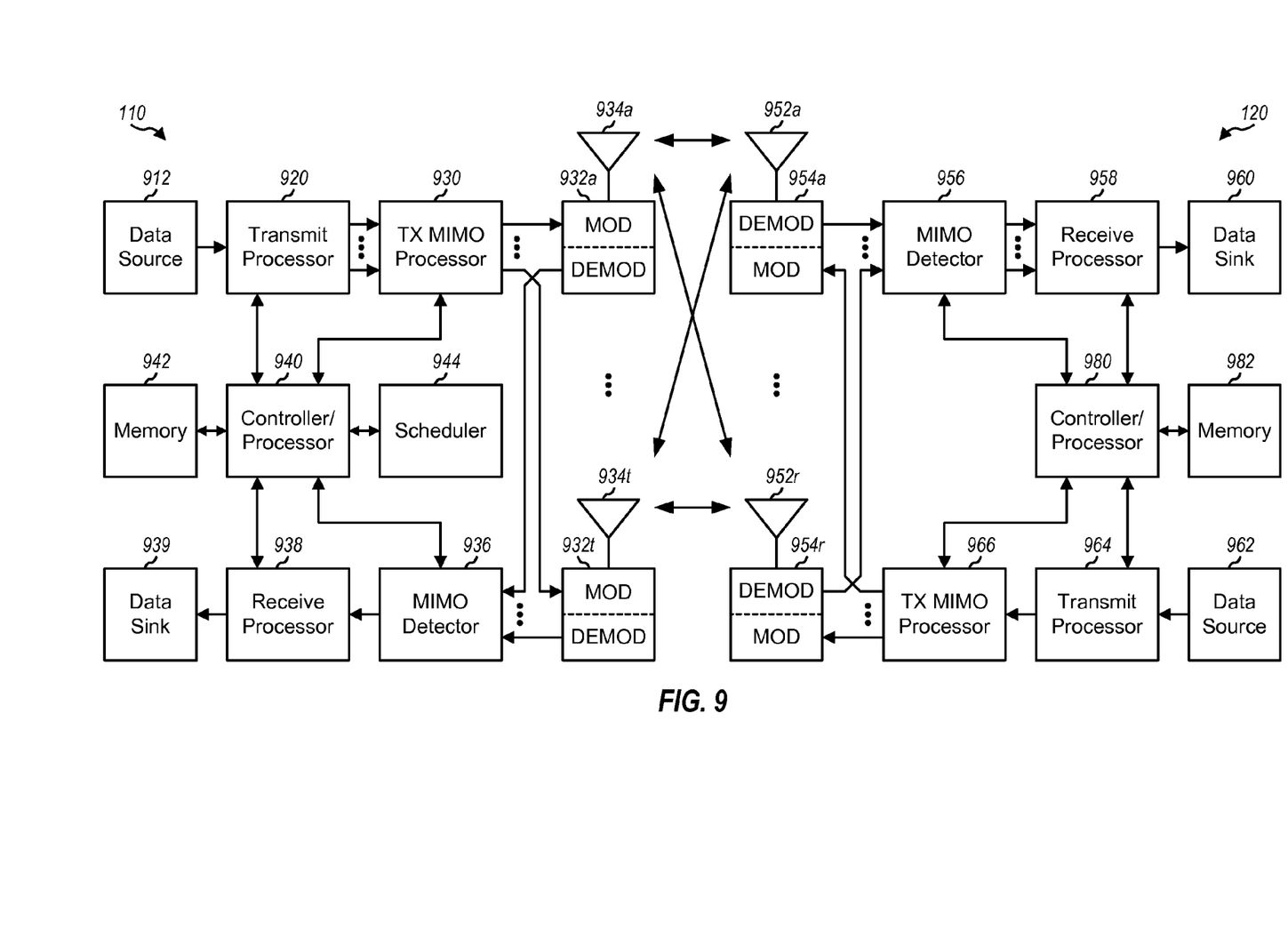
FIG. 9 shows a block diagram of a Node B and a UE.

FIG. 9 shows a block diagram of a design of a Node B 110 and a UE 120, which may be one of the Node Bs and one of the UEs in FIG. 1. In this design, Node B 110 is equipped with T antennas 934a through 934t, and UE 120 is equipped with R antennas 952a through 952r, where in general T≥1 and R≥1.

At Node B 110, a transmit processor 920 may receive data from a data source 912 for one or more UEs, process the data for each UE based on one or more modulation and coding schemes, and provide data symbols for all UEs. Transmit processor 920 may also process signaling/control information and provide signaling symbols. A transmit (TX) multiple-input multiple-output (MIMO) processor 930 may multiplex the data symbols, the signaling symbols, pilot symbols, and possibly other symbols. TX MIMO processor 930 may perform spatial processing (e.g., preceding) on the multiplexed symbols, if applicable, and provide T output symbol streams to T modulators (MODs) 932a through 932t. Each modulator 932 may process a respective output symbol stream (e.g., for OFDM) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At UE 120, antennas 952a through 952r may receive the downlink signals from Node B 110 and may provide received signals to demodulators (DEMODs) 954a through 954r, respectively. Each demodulator 954 may condition (e.g., filter, amplify, downconvert, and digitize) a respective received signal to obtain received samples. Each demodulator 954 may further process the received samples (e.g., for OFDM) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate, deinterleave, and decode) the detected symbols and provide decoded data for UE 120 to a data sink 960.

On the uplink, at UE 120, data from a data source 962 and signaling from controller/processor 980 may be processed by a transmit processor 964, precoded by a TX MIMO processor 966 if applicable, processed by modulators 954a through 954r (e.g., for SC-FDM), and transmitted to Node B 110. At Node B 110, the uplink signals from UE 120 may be received by antennas 934, processed by demodulators 932 (e.g., for SC-FDM), processed by a MIMO detector 936 if applicable, and further processed by a receive processor 938 to obtain the data and signaling transmitted by UE 120.

Controllers/processors 940 and 980 may direct the operation at Node B 110 and UE 120, respectively. Controller/processor 980 at UE 120 may perform or direct process 700 in FIG. 7 and/or other processes for the techniques described herein. Controller/processor 980 may determine the switch time based on the RTD between Node B 110 and UE 120 and the setup time for UE 120. Controller/processor 980 may also determine the placement of the FFT window based on the switch time, as described above, and may provide the FFT window placement to demodulators 954. Memories 942 and 982 may store data and program codes for UE 120 and Node B 110, respectively. A scheduler 944 may schedule UEs for downlink and/or uplink transmission and may provide assignments of resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving via a first link a first orthogonal frequency division multiplexing (OFDM) symbol that includes a cyclic prefix;
   discarding a first proportion of the cyclic prefix;
   receiving via the first link a second OFDM symbol following the first OFDM symbol and including a cyclic prefix;
   determining a switch time to switch from data reception on the first link to data transmission on a second link;
   determining a second proportion of the cyclic prefix of the second OFDM symbol to discard based on the switch time, the second proportion being less than the first proportion; and
   discarding the second proportion of the cyclic prefix of the second OFDM symbol.

2. The method of claim 1, wherein the determining the switch time comprises
   determining a round trip delay (RTD) between a user equipment (UE) and a Node B, and
   determining the switch time based on the RTD and a setup time for switching from data reception to data transmission.

3. The method of claim 1, wherein the discarding the second proportion comprises
   placing a fast Fourier transform (FFT) window to start within the cyclic prefix of the second OFDM symbol, and
   discarding a portion of the cyclic prefix of the second OFDM symbol outside of the FFT window.

4. The method of claim 3, wherein the placing the FFT window further comprises placing the FFT window to end at least the switch time earlier than the end of the second OFDM symbol.

5. The method of claim 1, wherein the first proportion comprises all of the cyclic prefix of the first OFDM symbol, and wherein the second proportion comprises less than all of the cyclic prefix of the second OFDM symbol.

6. The method of claim 1, further comprising:
   transmitting a single-carrier frequency division multiplexing (SC-FDM) symbol in accordance with transmit timing for data transmission on the second link, wherein the transmit timing is advanced relative to receive timing for data reception on the first link, and wherein the switch time is determined based on an amount of time advance between the transmit timing and the receive timing.

7. The method of claim 6, further comprising:
discarding a portion of a cyclic prefix of the SC-FDM symbol, the discarded portion of the cyclic prefix being determined based on the switch time.

8. The method of claim 1, wherein a guard period of zero OFDM symbols is used between data reception on the first link and data transmission on the second link.

9. The method of claim 1, wherein a guard period of an integer number of OFDM symbols is used between data reception on the first link and data transmission on the second link.

10. The method of claim 1, wherein the second OFDM symbol is a last OFDM symbol prior to a switch point from data reception on the first link to data transmission on the second link.

11. The method of claim 1, wherein data reception on the first link and data transmission on the second link are for time division duplex (TDD) operation or half-duplex frequency division duplex (FDD) operation.

12. The method of claim 1, wherein the first link is downlink and the second link is uplink.

13. An apparatus for wireless communication, comprising:
at least one processor configured to receive via a first link a first orthogonal frequency division multiplexing (OFDM) symbol that includes a cyclic prefix, to discard a first proportion of the cyclic prefix, to receive via the first link a second OFDM symbol following the first OFDM symbol and including a cyclic prefix, to determine a switch time to switch from data reception on the first link to data transmission on a second link, to determine a second proportion of the cyclic prefix of the second OFDM symbol to discard based on the switch time, the second proportion being less than the first proportion, and to discard the second proportion of the cyclic prefix of the second OFDM symbol.

14. The apparatus of claim 13, wherein the at least one processor is configured to determine a round trip delay (RTD) between a user equipment (UE) and a Node B, and to determine the switch time based on the RTD and a setup time for switching from data reception to data transmission.

15. The apparatus of claim 13, wherein the at least one processor is configured to place a fast Fourier transform (FFT) window to start within the cyclic prefix of the second OFDM symbol, and to discard a portion of the cyclic prefix of the second OFDM symbol outside of the FFT window.

16. The apparatus of claim 15, wherein the at least one processor is configured to place the FFT window to end at least the switch time earlier than the end of the second OFDM symbol.

17. The apparatus of claim 13, wherein the at least one processor is configured to transmit a single-carrier frequency division multiplexing (SC-FDM) symbol in accordance with transmit timing for data transmission on the second link, wherein the transmit timing is advanced relative to receive timing for data reception on the first link, and wherein the switch time is determined based on an amount of time advance between the transmit timing and the receive timing.

18. An apparatus for wireless communication, comprising:
means for receiving via a first link a first orthogonal frequency division multiplexing (OFDM) symbol that includes a cyclic prefix;
means for discarding a first proportion of the cyclic prefix;
means for receiving via the first link a second OFDM symbol following the first OFDM symbol and including a cyclic prefix;
means for determining a switch time to switch from data reception on the first link to data transmission on a second link;
means for determining a second proportion of the cyclic prefix of the second OFDM symbol to discard based on the switch time, the second proportion being less than the first proportion; and
means for discarding the second proportion of the cyclic prefix of the second OFDM symbol.

19. The apparatus of claim 18, wherein the means for determining the switch time comprises
means for determining a round trip delay (RTD) between a user equipment (UE) and a Node B, and
means for determining the switch time based on the RTD and a setup time for switching from data reception to data transmission.

20. The apparatus of claim 18, wherein the means for discarding the second proportion comprises
means for placing a fast Fourier transform (FFT) window to start within the cyclic prefix of the second OFDM symbol, and
means for discarding a portion of the cyclic prefix of the second OFDM symbol outside of the FFT window.

21. The apparatus of claim 20, wherein the means for placing the FFT window further comprises means for placing the FFT window to end at least the switch time earlier than the end of the second OFDM symbol.

22. The apparatus of claim 18, further comprising:
means for transmitting a single-carrier frequency division multiplexing (SC-FDM) symbol in accordance with transmit timing for data transmission on the second link, wherein the transmit timing is advanced relative to receive timing for data reception on the first link, and wherein the switch time is determined based on an amount of time advance between the transmit timing and the receive timing.

23. A computer program product, comprising:
a non-transitory computer-readable medium comprising:
code for causing at least one computer to receive via a first link a first orthogonal frequency division multiplexing (OFDM) symbol that includes a cyclic prefix,
code for causing at least one computer to discard a first proportion of the cyclic prefix,
code for causing at least one computer to receive via the first link a second OFDM symbol following the first OFDM symbol and including a cyclic prefix,
code for causing at least one computer to determine a switch time to switch from data reception on the first link to data transmission on a second link,
code for causing at least one computer to determine a second proportion of the cyclic prefix of the second OFDM symbol to discard based on the switch time, the second proportion being less than the first proportion, and
code for causing at least one computer to discard the second proportion of the cyclic prefix of the second OFDM symbol.

24. A method for wireless communication, comprising:
receiving via a first link a first orthogonal frequency division multiplexing (OFDM) symbol;
allocating resources of the first OFDM symbol to provide for a first level of inter-symbol interference (ISI) reduction;
determining a switch time to switch from data reception on the first link to data transmission on a second link;
receiving via the first link a second OFDM symbol following the first OFDM symbol; and allocating resources of the second OFDM symbol to provide for a second level of ISI reduction, the resources of the second OFDM symbol being allocated based at least in part on the switch time, and the second level of ISI reduction being less than the first level of ISI reduction.

* * * * *